US009122953B2

(12) United States Patent  
Fillion et al.

(10) Patent No.: US 9,122,953 B2  
(45) Date of Patent: Sep. 1, 2015

(54) METHODS AND SYSTEMS FOR CHARACTER SEGMENTATION IN AUTOMATED LICENSE PLATE RECOGNITION APPLICATIONS

(71) Applicant: Xerox Corporation, Norwalk, CT (US)

(72) Inventors: Claude S. Fillion, Rochester, NY (US); Aaron Michael Burry, Ontario, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 13/862,658

(22) Filed: Apr. 15, 2013

(65) Prior Publication Data

US 2014/0307924 A1    Oct. 16, 2014

(51) Int. Cl.
*G06K 9/00* (2006.01)
*G06K 9/46* (2006.01)

(52) U.S. Cl.
CPC ....................................... *G06K 9/46* (2013.01)

(58) Field of Classification Search
CPC ........................................................ G06K 9/46
USPC ....................................................... 382/105
See application file for complete search history.

(56) References Cited

U.S. PATENT DOCUMENTS

| 6,473,517 | B1 | 10/2002 | Tyan et al. |
| 8,134,578 | B2 | 3/2012 | Fillion et al. |
| 8,270,771 | B2 | 9/2012 | Fillion et al. |
| 8,290,213 | B2 | 10/2012 | Chen et al. |
| 8,331,621 | B1 | 12/2012 | Allen et al. |
| 2006/0123051 | A1* | 6/2006 | Hofman et al. ............ 707/104.1 |
| 2008/0131001 | A1 | 6/2008 | Hofman et al. |
| 2009/0208060 | A1 | 8/2009 | Wang et al. |
| 2012/0269398 | A1 | 10/2012 | Fan et al. |
| 2012/0275653 | A1 | 11/2012 | Hsieh et al. |
| 2013/0279758 | A1* | 10/2013 | Burry et al. .................. 382/105 |

OTHER PUBLICATIONS

Petroff, Matthew; OCR; http://www.mpetroff.net/projects/ocr/.
Avidan, Shamir; Seam Carving for Content-Aware Image Resizing.

* cited by examiner

*Primary Examiner* — Tom Y Lu
(74) *Attorney, Agent, or Firm* — Kermit D. Lopez; Luis M. Ortiz; Ortiz & Lopez, PLLC (57) ABSTRACT

Methods and systems for character segmentation in an automatic license plate recognition application. One or more images of a license plate are acquired. Then, a pixel-level importance may be calculated with respect to the image(s) of the license plate based on information within the image, such as gradient information and raw grayscale information. A seam selection can be then applied with respect to the pixel-level importance map and the image(s) by enforcing constraints based on known characteristics of license plates in order to provide for character segmentation with respect to the image(s) of the license plate.

20 Claims, 9 Drawing Sheets

METHODS AND SYSTEMS FOR CHARACTER SEGMENTATION IN AUTOMATED LICENSE PLATE RECOGNITION APPLICATIONS

TECHNICAL FIELD

Embodiments are generally related to data-processing methods and systems and processor-readable media. Embodiments are also related to the field of ALPR (Automated License Plate Recognition) applications.

BACKGROUND OF THE INVENTION

ALPR is an image-processing approach that often functions as the core module of "intelligent" transportation infrastructure applications. License plate recognition techniques, such as ALPR, can be employed to identify a vehicle by automatically reading a license plate utilizing image processing and character recognition technologies. A license plate recognition operation can be performed by locating a license plate in an image, segmenting the characters in the captured image of the plate, and performing an OCR (Optical Character Recognition) operation with respect to the characters identified.

The ALPR problem is often decomposed into a sequence of image processing operations—locating the sub-image containing the license plate (i.e., plate localization), extracting images of individual characters (i.e., segmentation), and performing optical character recognition (OCR) on these character images. In order for OCR to achieve high accuracy, it is necessary to obtain properly segmented characters.

There are a number of challenging noise sources present in license plate images captured under realistic conditions (i.e. field deployed solutions). These include: heavy shadows, non-uniform illumination (from one vehicle to the next, daytime versus nighttime, etc), challenging optical geometries (tilt, shear, or projective distortions), plate frames and/or stickers partially touching characters, partial occlusion of characters (e.g. trailer hitch ball), poor contrast, and general image noise (e.g. salt and pepper noise). For some ALPR systems deployed in the United States, variation between states in character font, width, and spacing further add to the difficulty of proper character segmentation.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved ALPR application.

It is another aspect of the disclosed embodiments to provide for methods, systems and processor-readable media for character segmentation in ALPR applications.

The aforementioned aspects and other objectives and advantages can now be achieved as described herein. Methods and systems are disclosed for character segmentation in an automatic license plate recognition application. One or more images of a license plate can be acquired. Then, a pixel-level importance operation can be calculated with respect to the image(s) of the license plate based upon information extracted from the image, such as, for example, gradient and raw grayscale information. A seam selection can be then applied with respect to the pixel-level importance map and the image(s) by enforcing one or more constraints based on known characteristics of license plates, such as spacing, in order to provide for character segmentation with respect to the image(s) of the license plate.

The disclosed embodiments therefore describe the application of a seam-carving based method to perform character segmentation of license plate images. The pixel level importance map is calculated based on both gradient and raw grayscale intensity information. Seam selection is then done by enforcing spacing constraints based on known characteristics of license plates.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
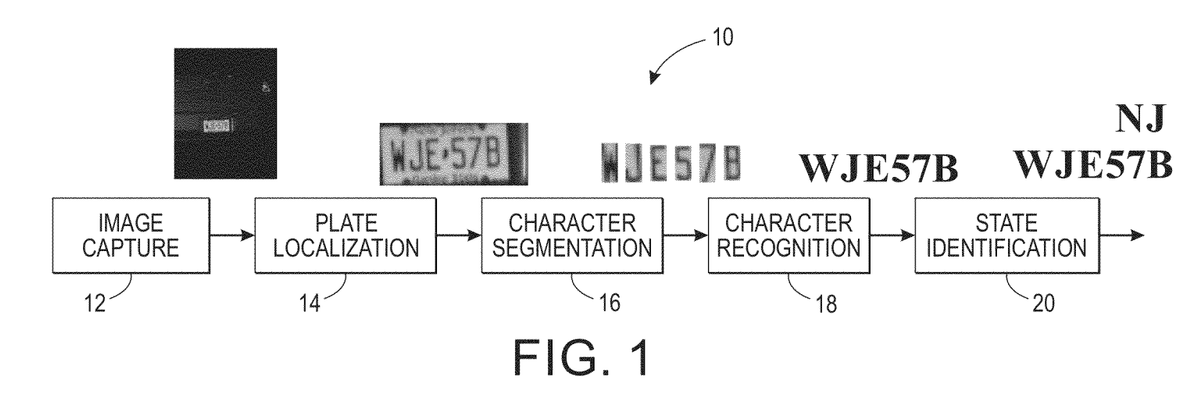
FIG. 1 illustrates a schematic overview of an ALPR representation.

FIG. 1 illustrates a block diagram of an ALPR system 10, which can be adapted for use in accordance with the disclosed embodiments. ALPR system 10 generally includes an image capture module 12 that provides data (e.g., an image) to a license plate localization module 14. Output from module 14 is input to a character segmentation module 16, which in turn outputs data that is input to a character recognition module 18. Data output from the character recognition module 18 is provided as input to a state identification module 20. FIG. 1 thus provides a visual context for the character segmentation approach described herein, which utilizes vertical projection histograms to provide an initial set of character boundaries within the tight bounding box image, as will be explained in more detail herein. An alternative ALPR system 130 is also described herein with respect to FIG. 13.

Figure 2:
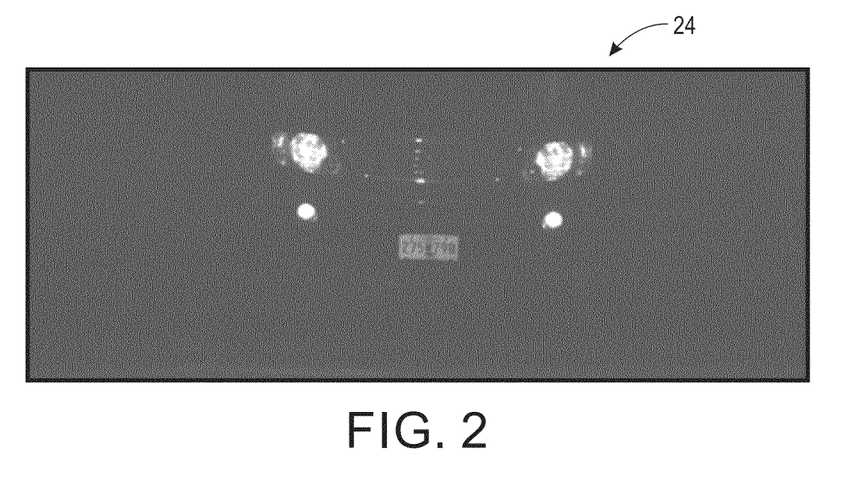
FIG. 2-3 illustrates an example image and its corresponding tight bounding box image, respectively.
Figure 3:
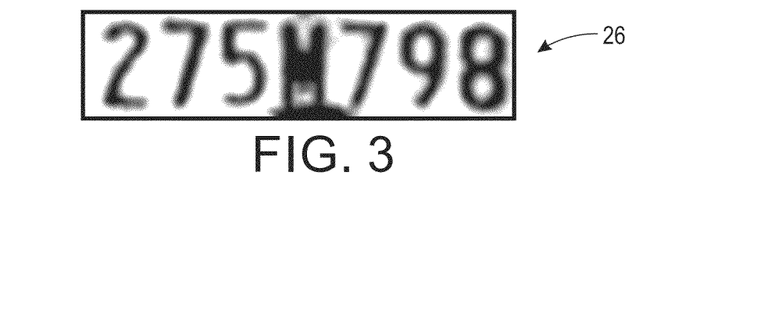
Figure 4:
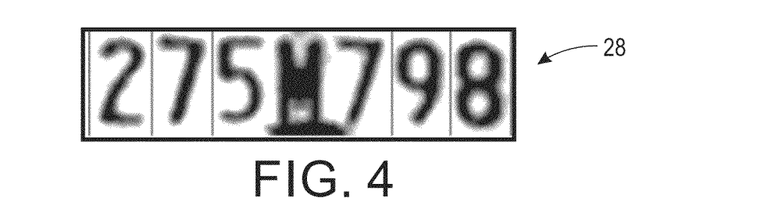
FIG. 4 illustrates an image 28 with character segmentation produced by a vertical histogram method.

FIG. 2-3 illustrates an example image 24 and its corresponding tight bounding box image 26, respectively. FIG. 4 illustrates an image 28 with character segmentation produced by a vertical histogram method. The use of a vertical histogram projection method can produce the character boundaries shown in FIG. 4. From FIG. 4, it is evident that the mark occurring below the 'M' and '7' characters produces a vertical sum that is not readily distinguishable from the sum produced by a character.

Figure 5:
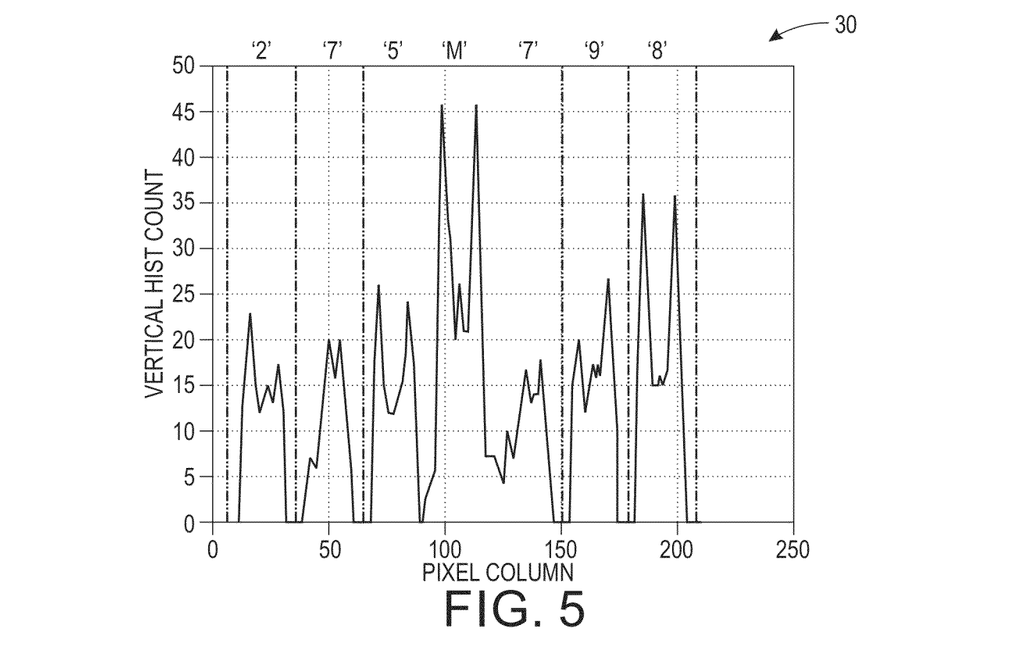
FIG. 5 illustrates an actual vertical projection histogram plot 30 with identified initial character boundaries.

FIG. 5 illustrates the actual vertical projection histogram plot 30, with initial character boundaries shown as red lines. The 'M'-'7' boundary is missed due to the non-zero histogram count, and the '5'-'M' boundary is missed because it is not of sufficient width.

Content-aware resizing is a method of resizing images whose goal is to preserve "visually important" regions of the image while eliminating the "unimportant" regions. This goal is similar to the goal of character segmentation in an ALPR system, which is to identify "visually important" characters and separate the characters along visually unimportant boundaries.

The task of content aware image resizing, also referred to as seam-carving, can be partitioned into two stages: 1.) developing an energy or "importance" map, which quantifies the importance of each image pixel, and 2.) A technique for selectively retaining the pixels of interest in the resized image. In our work, we develop an energy map for stage 1 that is suited to character segmentation, and add a spatial constraint to stage 2.

The disclosed embodiments apply a seam-curving method of image resizing to character segmentation. In this approach, the image is not resized. Instead, the method of identifying seams, or 8-connected paths of low energy pixels through an image, is utilized to identify boundaries between characters. These seams can then be used to segment characters. In the original seam-carving work, seams were selected strictly based upon the lowest cumulative energy along the seam path. Dynamic programming is used to find the seams in a computationally efficient manner.

Seam selection can be guided by adding weights to the energy map. Adding a positive weight to a region of the image will cause seams to avoid (ie preserve) that area of the image. Adding a negative weight to a region of an image will cause seams to pass through (ie remove) that area of the image. However, seams are still selected based upon the energy along the seam, and seams will concentrate along regions of low energy. Local concentration of seams is not necessarily desirable for segmentation applications. Our goal in segmentation is to find the lowest energy vertical seams which occur between characters. To accomplish this goal, we modify the seam selection process to incorporate a spatial component.

Figure 6:
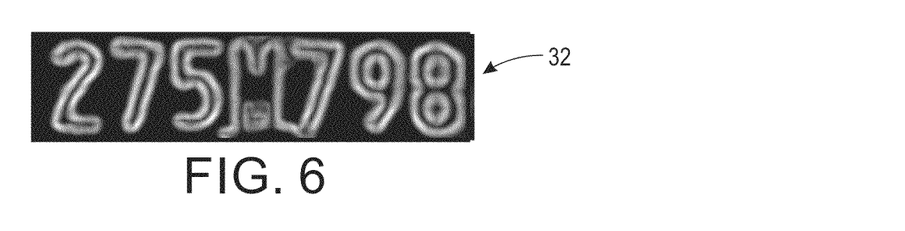
FIGS. 6-7 illustrate an energy map and cumulative energy map respectively for the image depicted in FIG. 2.
Figure 7:
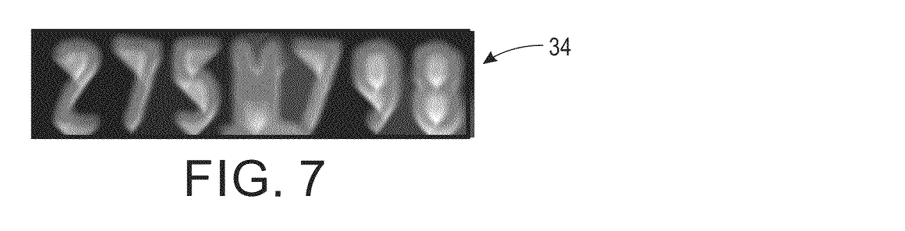

FIGS. 6-7 show the energy map (see images 32, 34) and cumulative energy map respectively for the image depicted in FIG. 2. Ideally we would like to find the eight seams needed to segment the characters within the image. The lowest energy vertical seam is found by selecting the minimum value along the bottom row of the cumulative energy map and tracking the lowest energy 8-connected path to the top of the image.

Figure 8:
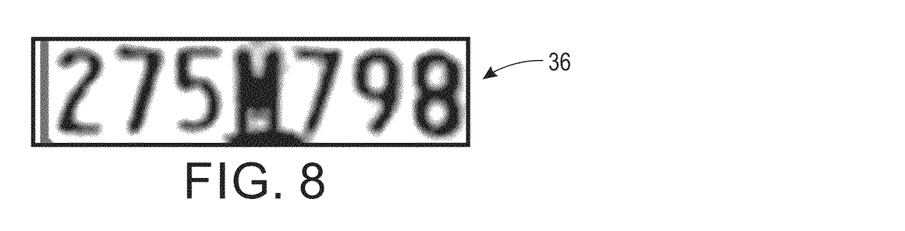
FIG. 8 illustrates an image depicting the eight lowest energy seams.
Figure 9:
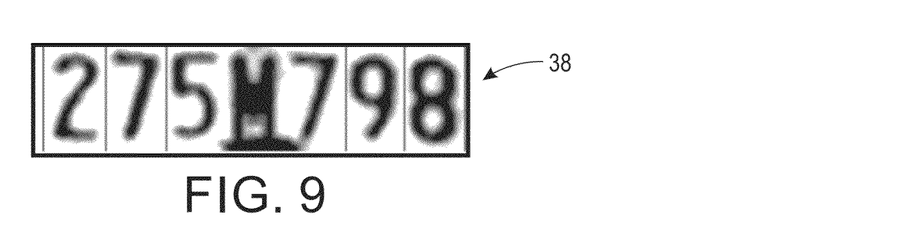
FIG. 9 illustrates an image depicting the lowest energy seams meeting distance constraints.

The eight seams having the lowest energy are shown in the image 36 depicted in FIG. 8. Many seams in this image have zero total energy and the seam-carving algorithm selects the first 8 in that list. Clearly to obtain the desired segmentation seams, additional information is needed to guide the seam selection process. We introduce the spatial constraint that the distance between seams at their midpoint in the image must be above a certain value. For an ALPR system in consideration, character sizes are approximately known and the seam distance criteria can be set to the minimum expected width of a character or logo. FIG. 9 shows the lowest energy seams via image 38 which meet the minimum distance criteria of 12 pixels.

Figure 10:
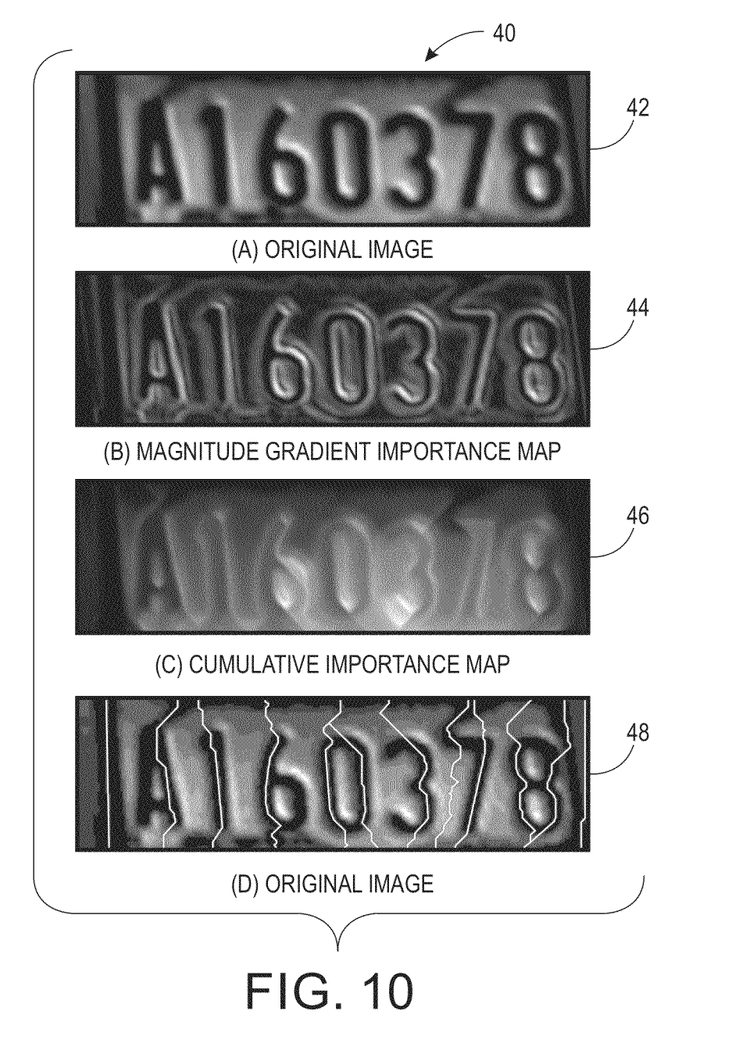
FIG. 10 illustrates results using a magnitude gradient map including the original image, magnitude gradient importance map, cumulative importance map and segmentation seams, in accordance with one or more aspects of the disclosed embodiments.

The example shown utilizes the magnitude of the gradient as the energy map. While commonly used as a measure of complexity in image resizing operations this operator is not particularly well suited for character segmentation, as it places emphasis on character edges. This limitation is demonstrated in FIG. 10, images 42, 44, 46 and 48. It should be noted that in this example 12 segmentation seams were found which satisfied our distance constraint. Image 42 is thus the original image. Image 44 shows the magnitude gradient importance map of the image. Image 46 depicts the cumulative importance map of the image, and image 48 shows the image overlaid with segmentation seams.

For character segmentation applications, the entire character is considered Important. Therefore, the image operator selected should incorporate this behavior. A variety of operators can be utilized individually or in a hybrid fashion to highlight the importance of characters within the image. This hybrid map can take the form of an importance map M, the weighted combination of gradient magnitude G, and the complement of image intensity $I_c$, as indicated by equation (1) below:

$$M(i,j) = \alpha G(i,j) + \beta I_c(i,j) \qquad (1)$$

where $\alpha=5$ and $\beta=1$.

Figure 11:
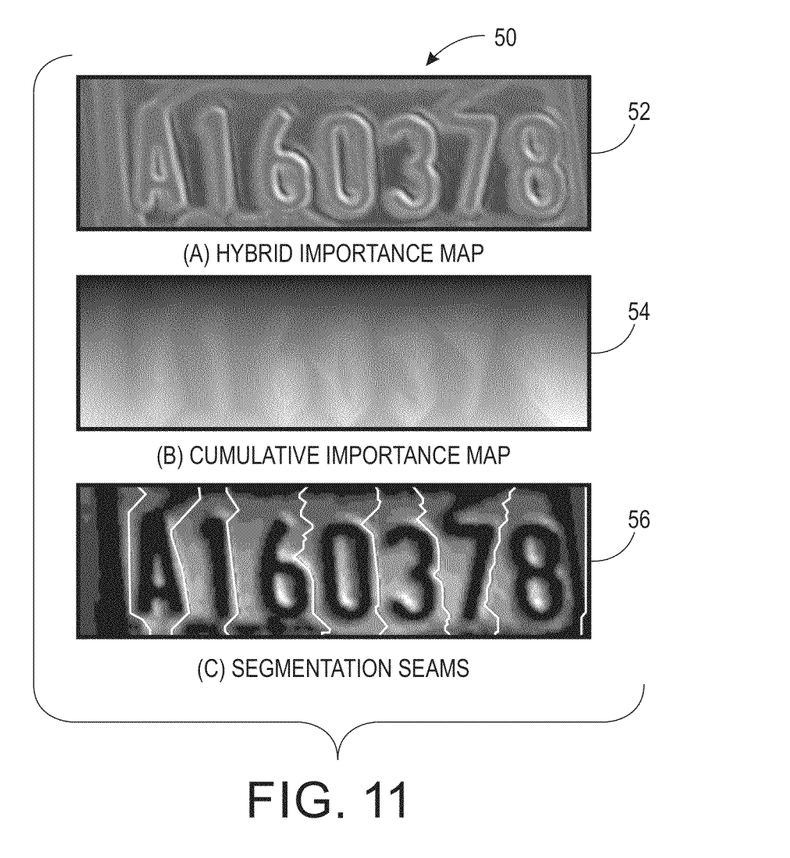
FIG. 11 illustrates results via a hybrid map including hybrid importance map, a cumulative importance map, and segmentation seams, in accordance with one or more aspects of the disclosed embodiments.

Using this hybrid importance map produces the results 50 shown in FIG. 11 with respect to images 52, 54, 56. Image 52 indicates the hybrid importance map of the image, while image 54 depicts the cumulative importance map. Image 56 shows the image overlaid with segmentation seams. Note that in this example eight segmentation seams were found which satisfy our distance constraint. The seam selection method we have described in this invention disclosure allows the number of segmentation seams selected to vary automatically. This is a benefit in ALPR systems because the number of characters in an image is not known a priori.

Typically, the extracted license plate characters that are to be presented for OCR require strictly vertical segmentation boundaries. This requires a translation from the segmentation seam information shown in FIG. 11. There are a number of potential embodiments for accomplishing this translation. For example, one embodiment could involve taking the horizontal midpoint of each seam. Another embodiment could involve the application of a weighted mean technique that provides more leverage to data points near the center (e.g., vertically) of each seam (i.e., since this is where the body of the characters are). Still another potential embodiment involves using the seam locations along the center (e.g., vertically) of the image. In other words, a vertical line can be drawn through the center point of each seam. Another potential embodiment involves performing a connected component analysis of the entire image region between seams and selecting the segmentation boundaries based on the largest blob in the region.

Figure 12:
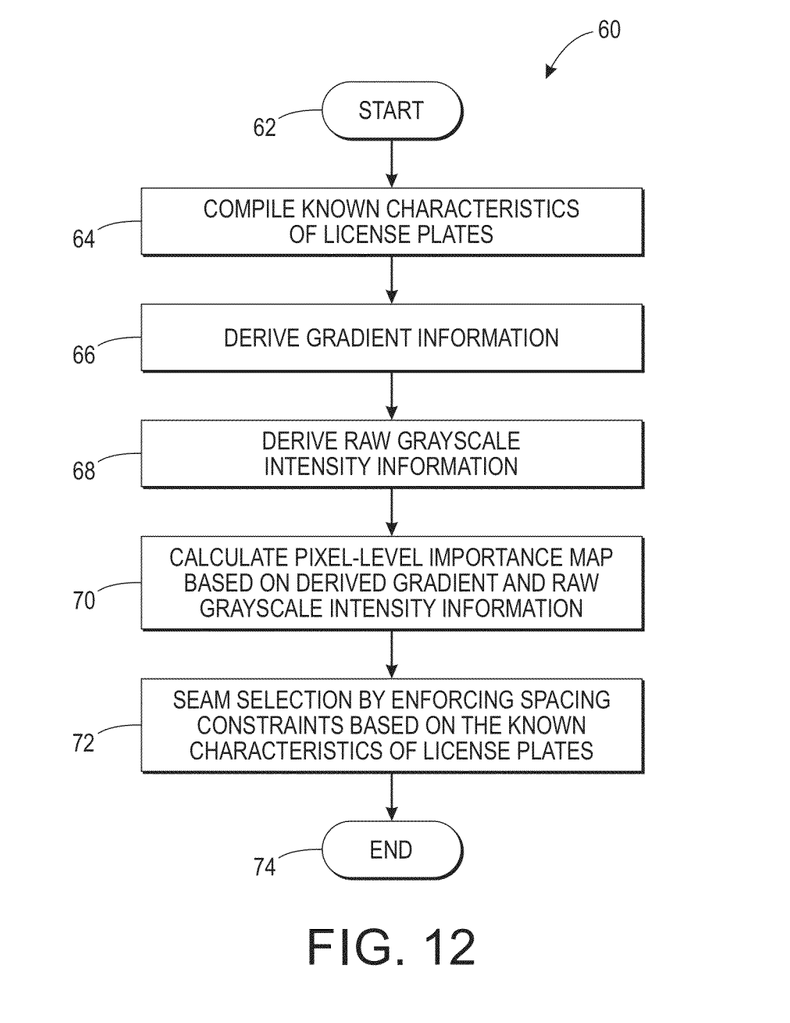
FIG. 12 illustrates a high-level flow chart of operations depicting logical operational steps of a method for character segmentation in ALPR applications, in accordance with one or more aspects of the disclosed embodiments.

FIG. 12 illustrates a high-level flow chart of operations depicting logical operational steps of a method 60 for character segmentation in ALPR applications, in accordance with one or more aspects of the disclosed embodiments. As shown at block 62, the process is initiated. Then, as indicated at block 64, a step or logical operation can be implemented to compile known characteristics of license plates. Alternatively, these characteristics may be calculated a priori and loaded into the system. Thereafter, as shown respectively at blocks 66 and 68, gradient information and raw grayscale intensity information can be derived.

Then, as shown at block 70, a step or logical operation can be implemented to calculate a pixel-level importance map based on the gradient and raw grayscale intensity information. Thereafter, as illustrated at block 72, a step or logical operation can be implemented for seam selection by enforcing one or more constraints based on the known characteristics of license plates. Thus, method 60 offers a seam-carving based method to perform character segmentation of license plate images. The pixel level importance map is calculated based on both gradient and raw grayscale intensity information. Seam selection is then done by enforcing spacing constraints based on known characteristics of license plates.

The method 60 shown in FIG. 12 can be implemented as a license plate character segmentation algorithm based on a seam carving algorithm incorporating spatial constraints and using a custom energy calculation including gradient as well as intensity information. Benefits of this approach include improved robustness against effects of stickers, logos, non-uniform illumination, and other noise. Additionally, combining intensity with gradient information targets the segmentation to between letters rather than within letter, and adding spatial constraints minimizes finding false seams. The method 60 of FIG. 12 can be provided by, for example, the character segmentation module 16 shown in FIG. 1 or the character segmentation engine 140 discussed below with respect to FIG. 13. It should be noted that character segmentation provided by this embodiment can serve as a replacement or as an augmentation to existing character segmentation methods.

Figure 13:
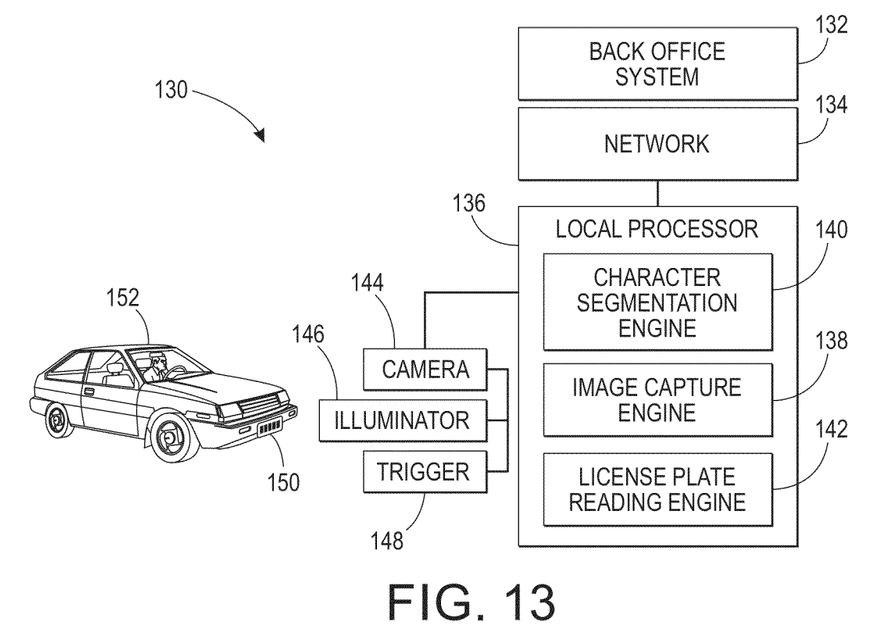
FIG. 13 illustrates a high-level block diagram of an ALPR system for identifying the characters within a license plate image, which can be implemented in accordance with an alternative embodiment.

FIG. 13 illustrates a high-level system diagram of an ALPR system 130 that can be adapted for use in accordance with the disclosed embodiments. The system 130 depicted in FIG. 13 generally includes or can be used with a vehicle 152 with a license plate 150. System 130 includes a trigger 148, a camera 144, and an illuminator 146 for capturing an image. System 130 further includes a local processor 136 that includes an image capture engine 138, a license plate reading engine 142, and a character segmentation engine 140. System 130 can further include a network 134 (e.g., a local wireless network, the Internet, cellular communications network, other data network, etc), and a back office system 132 for processing transactions and managing patron accounts. The local processor 136 can communicate with the back office system 132 via the network 134.

In FIG. 13, the license plate 150 is depicted located on the front of the vehicle 152, but the license plate 150 could also be located on the rear of the vehicle 152, as well. Some states (e.g., Texas) require license plates in both places, i.e., at the rear and front of a vehicle. In one scenario, the vehicle 152 enters a license plate reading zone which contains a trigger device 148 which controls an illuminator 146 which illuminates the license plate region of the vehicle 152, and a camera 144 which images the license plate 150 on the vehicle 152. The camera 144 can be connected to and/or communicate with the local processor unit 138. The character segmentation engine 140 can, for example, perform the steps or logical operations shown in blocks 62-74 of FIG. 12.

The image capture engine 138 controls the trigger 148, illuminator 146, and camera 144 in order to properly image the vehicle 152 and the license plate 150. Engine 140 calculates character segmentation data (e.g., see FIG. 12). An image of the license plate 150 and character segmentation data thereof can then be sent by the local processor 136 over the network 134 to the back office system 132. The back office system 132 can process the license plate and state jurisdiction data and can assess a toll or otherwise interact with a patron account or takes other transportation application specific actions.

As will be appreciated by one of skill in the art, the disclosed embodiments can be implemented as a method, data-processing system, or computer program product. Accordingly, the embodiments may take the form of an entirely hardware implementation, an entirely software embodiment or an embodiment combining software and hardware aspects all generally referred to as a "circuit" or "module" or "engine". For example an "engine" as discussed may be a software module. Examples of such engines and/or modules include the image capture engine 138, character segmentation engine 140 and license plate reading engine 142 shown in FIG. 13.

Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages, such as the "C" programming language or in a visually oriented programming environment, such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine, such that the instructions, which execute via the processor of the computer or other programmable data-processing apparatus, create means for implementing the functions/acts specified in the block or blocks discussed herein, such as, for example, the various instructions, modules, etc., discussed herein.

These computer program instructions may also be stored in a computer-readable memory that can direct a computer or other programmable data-processing apparatus to function in a particular manner, such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 14:
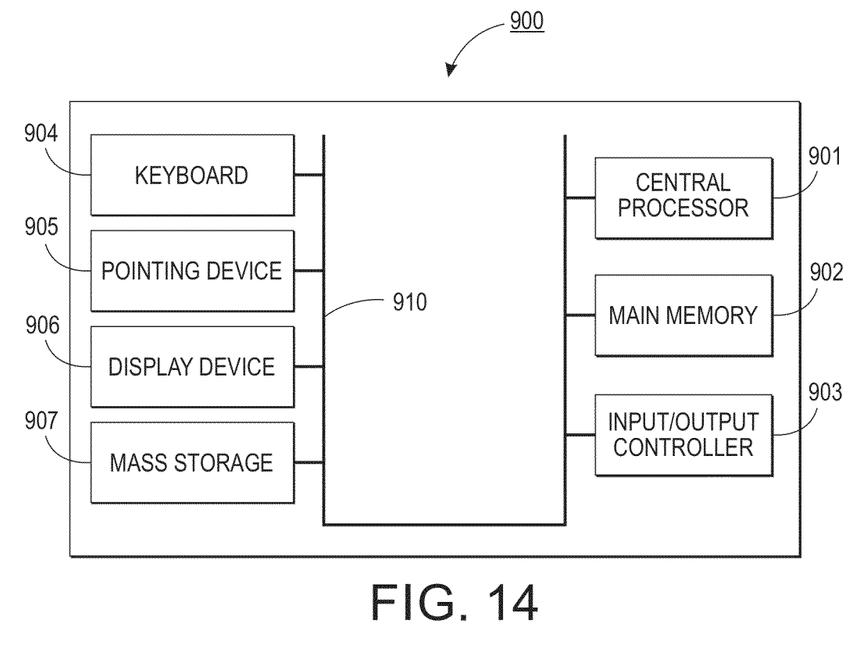
FIG. 14 illustrates a computer software system, which may be employed in some embodiments for directing the operation of the data-processing system depicted in FIG. 15.
Figure 15:
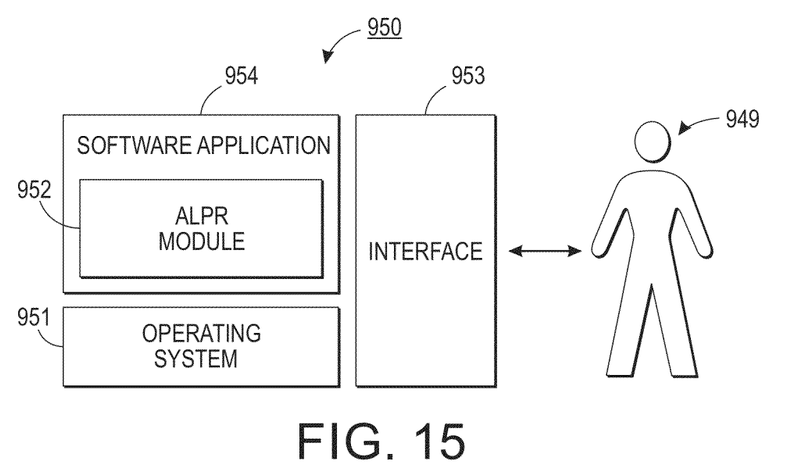
FIG. 15 illustrates a schematic view of a software system including an ALPR module using augmented data, an operating system, and a user interface, in accordance with the disclosed embodiments.

FIGS. 14-15 are provided as exemplary diagrams of data-processing environments in which embodiments of the present invention may be implemented. It should be appreciated that FIGS. 14-15 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 14, the disclosed embodiments may be implemented in the context of a data-processing system 900 that includes, for example, a central processor 901 (or other processors or a group of processors), a main memory 902, an input/output controller 903, and in some embodiments, a USB (Universal Serial Bus) or other appropriate peripheral connection. System 900 can also include a keyboard 904, an input device 905 (e.g., a pointing device, such as a mouse, track ball, pen device, etc.), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 and/or to and from other data-processing devices, components, computers, etc.

It can be appreciated that in some embodiments, the processor 901 may process instructions from, for example, the image capture engine 138, the character segmentation engine 140 and the license plate reading engine 142 shown in FIG.13. The data-processing system 900 may function in some embodiments as the local processor 136, or, for example, the back office system 132 shown in FIG. 13 and can further communicate with, for example, the camera 144, the illuminator 146, the trigger 148, and so forth, as shown the example ALPR system 130 depicted in FIG. 13.

FIG. 15 illustrates a computer software system 950, which may be employed for directing the operation of the data-processing system 900 depicted in FIG. 14. Software application 954, stored in main memory 902 and on mass storage 907 generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 15, module 952 can be implemented as, for example, a module that performs various ALPR logical instructions or operations such as those shown in FIGS. 12-13 and described with respect to other figures herein.

The data-processing system 900 can receive user commands and data through user interface 953, which is accessible by a user 949. These inputs may be then acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules (e.g., module 952) can include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The interface 953 (e.g., a graphical user interface) can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operating systems, such as, for example, a real time operating system (RTOS) more commonly employed in wireless systems may also be employed with respect to the operating system 951 and the interface 953. The software application 954 can include, for example, an ALPR module 952, which can include instructions for carrying out various steps, logical operations and/or modules as discussed and illustrated herein.

FIGS. 14-15 are thus intended as examples, and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for character segmentation with respect to an image of a license plate, said method comprising:
   acquiring at least one image of a license plate via an image-capturing unit;
   calculating a pixel-level importance map with respect to said at least one image of said license plate based on image attributes associated with said at least one image acquired via said image-capturing unit; and
   applying a seam selection with respect to said pixel-level importance map and said at least one image by enforcing at least one constraint based on known characteristics of license plates in order to provide for a character segmentation with respect to said at least one image of said license plate acquired by said image-capturing unit.

2. The method of claim 1 wherein said image attributes comprise at least one of gradient information and raw grayscale information.

3. The method of claim 1 wherein said at least one constraint comprises at least one of a spacing constraint and a seam grouping.

4. The method of claim 2 further comprising highlighting the importance of characters within said at least one image to support said character segmentation individually or with a hybrid map with respect to said at least one image.

5. The method of claim 4 wherein said hybrid map comprises an importance map M wherein a weighted combination of gradient magnitude G with respect to said gradient information and a complement of image intensity $I_c$ with respect to said raw grayscale information are indicated by the following equation: $M(i,j)=\alpha G(i,j)+\beta I_c(i,j)$ where $\alpha=5$ and $\beta=1$.

6. The method of claim 1 further comprising compiling said at least one constraint based on said known characteristics of license plates.

7. The method of claim 2 further comprising combining said gradient information with said raw grayscale information to target said character segmentation to between letters identified in said at least one image of said license plate rather than within a letter thereof to minimize false seams with respect to a seam selection.

8. The method of claim 7 further comprising adding a spacing constraint to said at least one constraint to assist in minimizing said false seams with respect to said seam selection.

9. The method of claim 1 wherein:
   said image attributes comprise at least one of gradient information and raw grayscale information; and
   said at least one constraint comprises at least one of a spacing constraint and a seam grouping.

10. A system for character segmentation with respect to an image of a license plate, said system comprising:
    a processor;
    a data bus coupled to said processor; and
    a computer-usable medium embodying computer program code, said computer-usable medium being coupled to said data bus, said computer program code comprising instructions executable by said processor and configured for:
    acquiring at least one image of a license plate;
    calculating a pixel-level importance map with respect to said at least one image of said license plate and based on image attributes associated with said at least one image; and
    applying a seam selection with respect to said pixel-level importance map and said at least one image by enforcing at least one constraint based on known characteristics of license plates in order to provide for a character segmentation with respect to said at least one image of said license plate.

11. The system of claim 10 wherein said image attributes comprise at least one of gradient information and raw grayscale information.

12. The system of claim 10 wherein said at least one constraint comprises at least one of a spacing constraint and a seam grouping.

13. The system of claim 11 wherein said instructions are further configured for highlighting the importance of characters within said at least one image to support said character segmentation individually or with a hybrid map with respect to said at least one image.

14. The system of claim 13 wherein said hybrid map comprises an importance map M wherein a weighted combination of gradient magnitude G with respect to said gradient information and a complement of image intensity $I_c$ with respect to said raw grayscale information are indicated by the following equation: $M(i,j)=\alpha G(i,j)+\beta I_c(i,j)$ where $\alpha=5$ and $\beta=1$.

15. The system of claim 10 wherein said instructions are further configured for compiling said at least one constraint based on said known characteristics of license plates.

16. The system of claim 11 wherein said instructions are further configured for combining said gradient information with said raw grayscale information to target said character segmentation to between letters identified in said at least one image of said license plate rather than within a letter thereof to minimize false seams with respect to a seam selection.

17. The system of claim 16 wherein said instructions are further configured for adding a spacing constraint to said at least one constraint to assist in minimizing said false seams with respect to said seam selection.

18. A non-transitory processor-readable medium storing computer code representing instructions to cause a process for character segmentation with respect to an image of a license plate, said computer code comprising code to:

acquire at least one image of a license plate;

calculate a pixel-level importance map with respect to said at least one image of said license plate and based on image attributes associated with said at least one image; and apply a seam selection with respect to said pixel-level importance map and said at least one image by enforcing at least one constraint based on known characteristics of license plates in order to provide for a character segmentation with respect to said at least one image of said license plate.

19. The processor-readable medium of claim 18 wherein said image attributes comprise at least one of gradient information and raw grayscale information.

20. The processor-readable medium of claim 18 wherein said at least one constraint comprises at least one of a spacing constraint and a seam grouping.

* * * * *